US010040962B2

(12) United States Patent
Steinmetz et al.

(10) Patent No.: US 10,040,962 B2
(45) Date of Patent: *Aug. 7, 2018

(54) PIGMENT PASTES COMPRISING AN AQUEOUS DISPERSION OF A COPOLYMER

(71) Applicant: BASF COATINGS GMBH, Muenster (DE)

(72) Inventors: Bernhard Steinmetz, Ruetschenhausen (DE); Nadia Luhmann, Karlstadt-Stetten (DE); Peggy Jankowski, Guentersleben (DE); Michael Matura, Kitzingen (DE); Hardy Reuter, Muenster (DE); Stephan Schwarte, Emsdetten (DE)

(73) Assignee: BASF Coatings GmbH, Muenster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/104,828

(22) PCT Filed: Nov. 19, 2014

(86) PCT No.: PCT/EP2014/074964
§ 371 (c)(1),
(2) Date: Jun. 15, 2016

(87) PCT Pub. No.: WO2015/090811
PCT Pub. Date: Jun. 25, 2015

(65) Prior Publication Data
US 2016/0326392 A1  Nov. 10, 2016

(30) Foreign Application Priority Data
Dec. 18, 2013 (EP) .................... 13197970

(51) Int. Cl.
| C08K 3/18 | (2006.01) |
| C08K 3/22 | (2006.01) |
| C09D 17/00 | (2006.01) |
| C08F 283/00 | (2006.01) |
| C08F 290/14 | (2006.01) |
| C09D 175/06 | (2006.01) |
| C09D 7/65 | (2018.01) |
| C08G 18/08 | (2006.01) |
| C08G 18/42 | (2006.01) |
| C08L 75/06 | (2006.01) |

(52) U.S. Cl.
CPC ........ C09D 17/001 (2013.01); C08F 283/006 (2013.01); C08F 290/147 (2013.01); C09D 7/65 (2018.01); C09D 17/004 (2013.01); C09D 17/006 (2013.01); C09D 17/007 (2013.01); C09D 175/06 (2013.01); C08G 18/0819 (2013.01); C08G 18/4288 (2013.01); C08L 75/06 (2013.01)

(58) Field of Classification Search
None
See application file for complete search history.

(56) References Cited

U.S. PATENT DOCUMENTS

| 3,705,164 | A | 12/1972 | Honig et al. |
| 6,538,059 | B1 | 3/2003 | Muller et al. |
| 2004/0234487 | A1* | 11/2004 | Bremser ............... B82Y 30/00 424/70.17 |
| 2013/0281636 | A1 | 10/2013 | Hartig et al. |

FOREIGN PATENT DOCUMENTS

| DE | 40 09 358 A1 | 10/1991 |
| DE | 44 37 535 A1 | 4/1996 |
| DE | 199 48 004 A1 | 7/2001 |
| DE | 199 48 004 B4 | 7/2001 |
| EP | 0 228 003 A1 | 7/1987 |
| EP | 0 634 431 A1 | 1/1995 |
| EP | 3 022 242 A1 | 5/2016 |
| WO | 91/15528 A1 | 10/1991 |
| WO | 92/15405 A1 | 9/1992 |
| WO | 00/63266 A2 | 10/2000 |
| WO | 2012/084668 A1 | 6/2012 |

OTHER PUBLICATIONS

English language translation of the International Preliminary Report on Patentability and Written Opinion dated Jun. 30, 2016 in PCT/EP2014/074964.
International Search Report dated Jan. 26, 2015 in PCT/EP2014/074964 Filed Nov. 19, 2014.

\* cited by examiner

*Primary Examiner* — Robert T Butcher
(74) *Attorney, Agent, or Firm* — Oblon, McClelland, Maier & Neustadt, L.L.P.

(57) ABSTRACT

The present invention relates to a pigment paste comprising at least one aqueous dispersion comprising at least one copolymer, said copolymer being preparable by (i) initially charging an aqueous dispersion of at least one polyurethane, and then (ii) polymerizing a mixture of olefinically unsaturated monomers in the presence of the polyurethane from (i), in which (a) a water-soluble initiator is used, (b) the olefinically unsaturated monomers are metered in such that a concentration of 6.0% by weight, based on the total amount of olefinically unsaturated monomers used for polymerization, in the reaction solution is not exceeded over the entire reaction time, and (c) the mixture of the olefinically unsaturated monomers comprises at least one polyolefinically unsaturated monomer, and further comprising a pigment, where the weight ratio of pigment to copolymer is at least 1.5. The invention further relates to the use of the copolymer for dispersion of pigments.

16 Claims, No Drawings

PIGMENT PASTES COMPRISING AN AQUEOUS DISPERSION OF A COPOLYMER

The present invention relates to pigment pastes comprising an aqueous dispersion of a copolymer, and to the use of the copolymer for dispersing pigments, especially effect pigments. The pigment pastes can be used especially for production of coating compositions, especially aqueous basecoat materials, in the automobile industry.

PRIOR ART

Pigment pastes and polymers used therein are known. Pigment pastes are formulations of pigment mixtures in carrier materials, namely different polymers in which the pigments are present in a higher concentration than in the later use. The later use is generally in the production of coating compositions. More particularly, in such pigment pastes, the weight ratio of pigments to polymers is generally greater than in coating compositions in which the paste is used. As well as the carrier materials (different polymers, also called paste binders), water and/or organic solvents are generally also present. Different additives such as wetting agents are also usable.

The use of pigment pastes in the coatings industry significantly eases the technically complex process of pigment dispersion. For example, dust-free processing of pigments during the formulation of coating materials is assured. In addition, the pigments in the paste are optimally wetted and very well-dispersed, such that an improved distribution state is attained in the coating material too. This of course results in improved performance properties of the coating material and of the paint system produced therefrom, for example a particularly homogeneous color or color distribution in the paint system.

In the production of these pastes, however, precisely matched polymers (paste binders) have to be used in order to obtain an optimally conditioned paste. Without the individual matching and exact selection of the polymer, the particular pigment usually cannot be dispersed optimally, such that the performance properties of the ultimately resulting paint system are thus not optimal either.

It is problematic in this context that the appropriate paste binder often does not correspond to the main binder in the coating composition. The paste thus always introduces a further binder component into the coating composition. This obviously makes the production process for the coating composition more complex. In addition, formulation latitude is lost in the production of coating materials. This is because, as a result of the use of a particular polymer in the paste, it may be necessary to match other coating material components to this polymer in turn. In addition, there is less room for the use of further additives and/or binder components in the paint system, since such a use can particularly lower the proportion of the main binder, which is of primary importance, to too low a level.

If an attempt is made to compensate for the above disadvantages in terms of formulation latitude by using a polymer (paste binder) corresponding to the main binder in the resulting coating composition in the paste, it is generally necessary to enter into compromises with regard to the choice of the main binder and hence the quality of the resulting coating composition and of the multicoat paint system produced therewith. An example of a recurrent problem with multicoat paint systems is susceptibility to pinholes. As is well known, these can arise in the course of application of coating compositions through unwanted inclusions of air, solvent and/or moisture. The inclusions become perceptible in the form of bubbles below the surface of the overall paint system and can break open in the final curing operation. The corresponding holes are also called pinholes. The higher the coat thicknesses of the paint system, the more susceptible it will be to pinholes.

DE 199 48 004 A1 describes a polyurethane-polyacrylate copolymer which is used in aqueous basecoat materials. The paste binder used is a different polymer. In addition, the basic performance properties of aqueous basecoat material are in need of improvement, especially with regard to stability to pinholes.

WO 91/15528 A1 likewise describes a polyurethane-polyacrylate copolymer which is used as a main binder and as a paste binder in aqueous basecoat materials. The performance properties of a paint system produced from this basecoat material are in great need of improvement.

Problem

The problem addressed by the present invention is thus that of providing a pigment paste which, as a paste binder, comprises a polymer which can likewise be used as a main binder in corresponding aqueous basecoat materials. The aqueous basecoat materials should nevertheless be able to optimally fulfill, if not actually improve upon, the required performance properties, especially a good visual appearance and good stability to pinholes. In this way, not just optimal properties of a resulting paint system should be obtained, but improved formulation latitude should additionally be gained.

TECHNICAL SOLUTION

It has been found that the stated problems have been solved by a pigment paste comprising
at least one aqueous dispersion comprising at least one copolymer (CP), said copolymer (CP) being preparable by
 (i) initially charging an aqueous dispersion of at least one polyurethane, and then
 (ii) polymerizing a mixture of olefinically unsaturated monomers in the presence of the polyurethane from (i), in which
  (a) a water-soluble initiator is used,
  (b) the olefinically unsaturated monomers are metered in such that a concentration of 6.0% by weight, based on the total amount of olefinically unsaturated monomers used for polymerization, in the reaction solution is not exceeded over the entire reaction time, and
  (c) the mixture of the olefinically unsaturated monomers comprises at least one polyolefinically unsaturated monomer, and
at least one pigment (P),
where the weight ratio of the at least one pigment to the at least one copolymer (CP) is greater than 1.5.

The novel pigment paste is also referred to hereinafter as pigment paste of the invention, and accordingly forms part of the subject matter of the present invention. Preferred embodiments of the pigment paste are apparent from the description which follows and from the dependent claims.

The present invention likewise provides for the use of an aqueous dispersion comprising at least one copolymer (CP) for production of pigment pastes, or for dispersion of pigments. The present invention also relates to a process for producing coating compositions using a pigment paste of the invention.

The pastes of the invention comprise, as a polymer or paste binder, a copolymer (CP) which can likewise be used optimally as a main binder in coating compositions, especially aqueous basecoat materials, and leads to excellent performance properties therein. Accordingly, the inventive paste can combine these performance properties with a corresponding formulation latitude.

DETAILED DESCRIPTION

The pigment paste of the invention comprises a specific aqueous dispersion comprising at least one specific copolymer (CP), preferably exactly one copolymer (CP).

A copolymer in the context of the present invention refers to polymers formed from different polymer types, for example a polyurethane and a (meth)acrylate polymer. This explicitly includes both polymers covalently bonded to one another and those in which the various polymers are bonded to one another by adhesion. Combinations of both kinds of bonding are also covered by this definition. The term "(meth)acrylate" covers acrylates, methacrylates and mixtures thereof.

The copolymer (CP) is preparable by
(i) initially charging an aqueous dispersion of at least one polyurethane, and then
(ii) polymerizing a mixture of olefinically unsaturated monomers in the presence of the polyurethane from (i), where
a. a water-soluble initiator is used,
b. the olefinically unsaturated monomers are metered in such that a concentration of 6.0% by weight, based on the total amount of olefinically unsaturated monomers used for polymerization, in the reaction solution is not exceeded over the entire reaction time, and
c. the mixture of the olefinically unsaturated monomers comprises at least one polyolefinically unsaturated monomer.

In the first preparation step, an aqueous dispersion of a polyurethane resin is initially charged.

Suitable saturated or unsaturated polyurethane resins are described, for example, in German patent application DE 199 48 004 A1, page 4 line 19 to page 11 line 29 (polyurethane prepolymer B1),
European patent application EP 0 228 003 A1, page 3 line 24 to page 5 line 40,
European patent application EP 0 634 431 A1, page 3 line 38 to page 8 line 9, or
international patent application WO 92/15405, page 2 line 35 to page 10 line 32.

The polyurethane resin is prepared using firstly, preferably, the aliphatic, cycloaliphatic, aliphatic-cycloaliphatic, aromatic, aliphatic-aromatic and/or cycloaliphatic-aromatic polyisocyanates known to those skilled in the art. Particular preference is given to aliphatic and aliphatic-cycloaliphatic polyurethane resins.

The alcohol components used for the preparation of the polyurethane resins are preferably the saturated and unsaturated polyols known to those skilled in the art, and optionally, in minor amounts, also monoalcohols. More particularly, diols and, optionally in minor amounts, triols are used to introduce branches. Examples of suitable polyols are saturated or olefinically unsaturated polyester polyols and/or polyether polyols. More particularly, the polyols used are polyester polyols, especially those having a number-average molecular weight of 400 to 5000 g/mol. Unless specifically indicated otherwise, the number-average molecular weight in the context of the present invention is determined by means of vapor pressure osmosis. Measurement was effected using a vapor pressure osmometer (model 10.00 from Knauer) on concentration series of the component under investigation in toluene at 50° C., with benzophenone as calibration substance for determination of the experimental calibration constant of the instrument employed (in accordance with E. Schröder, G. Müller, K.-F. Arndt, "Leitfaden der Polymercharakterisierung" [Introduction to polymer characterization], Akademie-Verlag, Berlin, pp. 47-54, 1982, in which benzil was used as calibration substance).

The polyurethane initially charged in aqueous dispersion is preferably a hydrophilically stabilized polyurethane. For hydrophilic stabilization and/or to increase dispersibility in aqueous medium, the polyurethane resin may contain particular ionic groups and/or groups which can be converted to ionic groups (potentially ionic groups). Polyurethane resins of this kind are referred to for the purposes of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted to cations by neutralizing agents and/or quaternizing agents, and/or cationic groups (cationic modification)
or
functional groups which can be converted to anions by neutralizing agents, and/or anionic groups (anionic modification)
or
nonionic hydrophilic groups (nonionic modification)
or
combinations of the aforementioned groups.

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which, by neutralizing agents and/or quaternizing agents, can be converted into cationic groups). Also deserving of mention are the cationic groups—groups prepared from the aforementioned functional groups using neutralizing agents and/or quaternizing agents that are known to the skilled person—such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are, as is known, for example, carboxylic acid, sulfonic acid and/or phosphonic acid groups, more particularly carboxylic acid groups (functional groups which, by neutralizing agents, can be converted into anionic groups), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the ionic or potentially ionic groups. The nonionic modifications are introduced for example through the incorporation of poly(ethylene) oxide polymers as lateral or terminal groups of the polyurethane molecules. The hydrophilic modifications are introduced, for example, via compounds which contain at least one group that is reactive toward isocyanate groups—preferably at least one hydroxyl group. To introduce the ionic modification it is possible to use monomers which as well as the modifying groups contain at least one hydroxyl group. To introduce the non-ionic modifications, preference is given to using the polyetherdiols and/or alkoxypoly(oxyalkylene) alcohols that are known to the skilled person.

Preference is given to adding at least one organic solvent to the initially charged polyurethane dispersion, said organic solvent preferably being miscible in any ratio with water and in any ratio with the mixture of olefinically unsaturated monomers. Suitable organic solvents are N-methylpyrrolidone, N-ethylpyrrolidone and ether alcohols, such as methoxypropanol in particular, though it should be noted that pyrrolidone-based solvents may be dispensed with for environmental reasons alone. However, the amount of the organic solvent is selected such that the aqueous character of the dispersion is conserved.

In the second preparation step, a polymerization of a mixture of olefinically unsaturated monomers in the presence of the polyurethane is conducted by the methods of what is called free-radical emulsion polymerization in the presence of at least one polymerization initiator.

The polymerization initiator used has to be a water-soluble initiator. Examples of suitable initiators are potassium peroxodisulfate, sodium peroxodisulfate or ammonium peroxodisulfate, and also hydrogen peroxide, tert-butyl hydroperoxide, 2,2'-azobis(2-amidoisopropane) dihydrochloride, 2,2'-azobis(N,N'-dimethyleneisobutyramidine) dihydrochloride or 2,2-azobis(4-cyano)pentanoic acid. The initiators are used either alone or in a mixture, for example mixtures of hydrogen peroxide and sodium persulfate.

The known redox initiator systems can also be used as polymerization initiators. Such redox initiator systems comprise at least one peroxide-containing compound in combination with a redox coinitiator, for example reducing sulfur compounds, for example bisulfites, sulfites, thiosulfates, dithionites or tetrathionates of alkali metals and ammonium compounds, sodium hydroxymethanesulfinate dihydrate and/or thiourea. For instance, it is possible to use combinations of peroxodisulfates with alkali metal or ammonium hydrogensulfites, for example ammonium peroxodisulfate and ammonium disulfite. The weight ratio of peroxide-containing compounds to the redox coinitiators is preferably 50:1 to 0.05:1. In combination with the initiators or the redox initiator systems, it is additionally possible to use transition metal catalysts, for example iron salts, nickel salts, cobalt salts, manganese salts, copper salts, vanadium salts or chromium salts, such as iron(II) sulfate, cobalt(II) chloride, nickel(II) sulfate, copper(I) chloride, manganese(II) acetate, vanadium(III) acetate, manganese(II) chloride. Based on the monomers, these transition metal salts are typically used in amounts of 0.1 to 1000 ppm. For instance, it is possible to use combinations of hydrogen peroxide with iron(II) salts, for example 0.5 to 30% hydrogen peroxide and 0.1 to 500 ppm of Mohr's salt.

The initiators are preferably used in an amount of 0.05 to 20% by weight, preferably 0.05 to 10%, more preferably of 0.1 to 5% by weight, based on the total weight of the olefinically unsaturated monomers used for polymerization. The terms "total amount" and "total weight" are equivalent.

The result of the use of the water-soluble initiator is that olefinically unsaturated monomers which are added to the aqueous dispersion initially charged can react immediately to give oligomers. These oligomers have a lesser tendency to penetrate into the polyurethane particles of the dispersion initially charged than the smaller monomers.

The polymerization is appropriately conducted, for example, at a temperature of greater than 0 to 160° C., preferably 60 to 95° C.

Preference is given to working under exclusion of oxygen, preferably in a nitrogen stream. In general, the polymerization is performed at standard pressure, but it is also possible to employ lower pressures or higher pressures, especially when polymerization temperatures above the boiling point of the monomers and/or of the organic solvents are employed.

The copolymers (CP) for use in accordance with the invention are prepared by free-radical aqueous emulsion polymerization, in which case surfactants or protective colloids can be added to the reaction medium. A list of suitable emulsifiers and protective colloids is given, for example, in Houben Weyl, Methoden der organischen Chemie [Methods of Organic Chemistry], volume XIV/1 Makromolekulare Stoffe [Macromolecular Substances], Georg Thieme Verlag, Stuttgart 1961, p. 411 ff.

An important factor for the preparation of the aqueous dispersions for use in accordance with the invention, comprising the copolymer (CP), is the control of the conditions of the polymerization reaction of the mixture of olefinically unsaturated monomers in the presence of the polyurethane. This is conducted in the manner of what is called a "starve feed", "starve fed" or "starved feed" polymerization.

A starved feed polymerization in the context of the present invention is considered to be an emulsion polymerization in which the content of residual monomers in the reaction solution is minimized during the reaction time, meaning that the metered addition of the olefinically unsaturated monomers is effected in such a way that a concentration of 6.0% by weight, preferably 5.0% by weight, more preferably 4.0% by weight, particularly advantageously 3.5% by weight, based in each case on the total amount of olefinically unsaturated monomers used for polymerization, in the reaction solution is not exceeded over the entire reaction time. In this context, further preference is given to concentration ranges of the olefinically unsaturated monomers of 0.01 to 6.0% by weight, preferably 0.02 to 5.0% by weight, more preferably 0.03 to 4.0% by weight, especially 0.05 to 3.5% by weight, based in each case on the total amount of olefinically unsaturated monomers used for polymerization. For example, the highest proportion (or concentration) detectable during the reaction may be 0.5% by weight, 1.0% by weight, 1.5% by weight, 2.0% by weight, 2.5% by weight or 3.0% by weight, while all further values detected are then below the values specified here. The term "concentration" in this context is thus obviously equivalent to the term "proportion".

The concentration of the monomers in the reaction solution, referred to hereinafter as free monomers, can be controlled in various ways.

One way of minimizing the concentration of the free monomers is to select a very low metering rate for the mixture of olefinically unsaturated monomers. When the rate of metered addition is so low that all monomers can react very quickly as soon as they are in the reaction solution, it is possible to ensure that the concentration of the free monomers is minimized.

As well as the metering rate, it is important that sufficient free radicals are always present in the reaction solution, so that the monomers metered in can each be reacted very rapidly. For this purpose, reaction conditions should preferably be selected such that the initiator feed is already commenced prior to commencement of the metered addition of the olefinically unsaturated monomers. Preferably, the metered addition is commenced at least 5 minutes beforehand, more preferably at least 10 minutes beforehand. Preferably at least 10% by weight of the initiator, more preferably at least 20% by weight, most preferably at least 30% by weight of the initiator, based in each case on the total amount of initiator, are added prior to commencement of the metered addition of the olefinically unsaturated monomers.

The amount of initiator is an important factor for the sufficient presence of free radicals in the reaction solution. The amount of initiator should be selected such that sufficient free radicals are available at any time, so that the monomers metered in can react. If the amount of initiator is increased, it is also possible to react greater amounts of monomers at the same time.

A further factor which can determine the reaction rate is the structure of the monomers, i.e. particularly the structural properties thereof and the reactivity which derives therefrom.

The concentration of the free monomers can thus be controlled through the interplay of the amount of initiator, rate of initiator addition, rate of monomer addition, and through the choice of monomers. Both the slowing of the metered addition and the increase in the amount of initiator, and also the early commencement of the addition of the initiator, serve the particular aim of keeping the concentration of the free monomers below the abovementioned limits.

The concentration of the monomers in the reaction solution can be determined by gas chromatography at any juncture in the reaction. Typical parameters for the gas chromatography determination are as follows: 50 m silica capillary column with polyethylene glycol phase or 50 m silica capillary column with polydimethylsiloxane phase, helium carrier gas, split injector 150° C., oven temperature 40 to 220° C., flame ionization detector, detector temperature 275° C., internal standard: isobutyl acrylate. In the context of the present invention, the concentration of the monomers is preferably determined by gas chromatography, especially while observing the abovementioned parameters.

Should this analysis determine a concentration of free monomers close to the limit for the starved feed polymerization, for example because of a high proportion of olefinically unsaturated monomers having a low reactivity, the abovementioned parameters can be utilized to control the reaction. In this case, for example, the metering rate of the monomers can be reduced and/or the amount of initiator can be increased.

Suitable olefinically unsaturated monomers may be mono- or polyolefinically unsaturated. Preferably, at least one monoolefinically unsaturated and at least one polyolefinically unsaturated monomer are present.

Examples of suitable monoolefinically unsaturated monomers include vinylic monoolefinically unsaturated monomers, such as especially (meth)acrylate-based monoolefinically unsaturated monomers and allyl compounds. Examples are also alpha,beta-unsaturated carboxylic acids. Preference is given to using at least, but not necessarily exclusively, (meth)acrylate-based monoolefinically unsaturated monomers.

The (meth) acrylate-based, monoolefinically unsaturated monomers may, for example, be (meth)acrylic acid and esters, nitriles or amides of (meth)acrylic acid.

Preference is given to esters of (meth)acrylic acid having a non-olefinically unsaturated R radical.

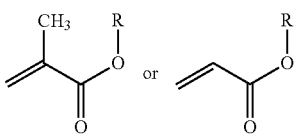

The R radical may be aliphatic or aromatic. The R radical is preferably aliphatic.

The R radical may, for example, be an alkyl radical, or contain heteroatoms. Examples of R radicals containing heteroatoms are ethers. Preference is given to using at least, but not necessarily exclusively, monomers in which the R radical is an alkyl radical.

If R is an alkyl radical, it may, for example, be a linear, branched or cyclic alkyl radical. In all three cases, it may comprise unsubstituted alkyl radicals or alkyl radicals substituted by functional groups. The alkyl radical has preferably 1 to 20, more preferably 1 to 10, carbon atoms.

Particularly preferred monounsaturated esters of (meth)acrylic acid having an unsubstituted alkyl radical are methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, hexyl (meth)acrylate, ethylhexyl (meth)acrylate, 3,3,5-trimethylhexyl (meth)acrylate, stearyl (meth)acrylate, lauryl (meth)acrylate, cycloalkyl (meth)acrylates such as cyclopentyl (meth)acrylate, isobornyl (meth)acrylate and cyclohexyl (meth)acrylate, very particular preference being given to n- and tert-butyl (meth)acrylate and methyl methacrylate.

Suitable monounsaturated esters of (meth)acrylic acid having a substituted alkyl radical may preferably be substituted by one or more hydroxyl groups.

Particularly preferred monounsaturated esters of (meth)acrylic acid having an alkyl radical substituted by one or more hydroxyl groups are 2-hydroxyethyl (meth)acrylate, 2-hydroxypropyl (meth)acrylate, 3-hydroxypropyl (meth)acrylate, 3-hydroxybutyl (meth)acrylate and 4-hydroxybutyl (meth)acrylate.

Possible further vinylic monounsaturated monomers are monomers having a non-olefinically unsaturated R' radical on the vinyl group.

The R' radical may be aliphatic or aromatic, preference being given to aromatic radicals.

The R' radical may be a hydrocarbyl radical, or contain heteroatoms. Examples of R' radicals containing heteroatoms are ethers, esters, amides, nitriles and heterocycles. Preferably, the R' radical is a hydrocarbyl radical. If R' is a hydrocarbyl radical, it may be substituted or unsubstituted by heteroatoms, preference being given to unsubstituted radicals. Preferably, the R' radical is an aromatic hydrocarbyl radical.

Particularly preferred further vinylic olefinically unsaturated monomers are vinylaromatic hydrocarbons, especially vinyltoluene, alpha-methylstyrene and especially styrene.

Further preferred monomers containing heteroatoms are olefinically unsaturated monomers such as acrylonitrile, methacrylonitrile, acrylamide, methacrylamide, N-dimethylacrylamide, vinyl acetate, vinyl propionate, vinyl chloride, N-vinylpyrrolidone, N-vinylcaprolactam, N-vinylformamide, N-vinylimidazole and N-vinyl-2-methylimidazoline.

Examples of suitable polyolefinically unsaturated monomers include esters of (meth)acrylic acid having an olefinically unsaturated R" radical, and allyl ethers of polyhydric alcohols.

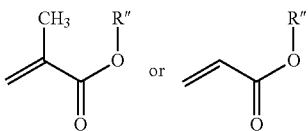

The R" radical may, for example, be an allyl radical or a (meth)acrylic ester radical.

Preferred polyolefinically unsaturated monomers are ethylene glycol di(meth)acrylate, propylene 1,2-glycol di(meth)acrylate, propylene 2,2-glycol di(meth)acrylate, butane-1,4-diol di(meth)acrylate, neopentyl glycol di(meth)acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate and allyl (meth)acrylate.

Preferred polyolefinically unsaturated compounds are also acrylic and methacrylic esters of alcohols having more than two OH groups, for example trimethylolpropane tri(meth)acrylate or glyceryl tri(meth)acrylate, but also trimethylolpropane di(meth)acrylate monoallyl ether, trimethylolpropane (meth)acrylate diallyl ether, pentaerythrityl tri(meth)acrylate monoallyl ether, pentaerythrityl di(meth)acrylate diallyl ether, pentaerythrityl (meth)acrylate triallyl ether, triallylsucrose, and pentaallylsucrose.

Particular preference is given to using allyl methacrylate as the polyolefinically unsaturated monomer. The mixture of the olefinically unsaturated monomers comprises at least one polyolefinically unsaturated monomer. Preferably, the mixture of the olefinically unsaturated monomers also comprises one or more monounsaturated esters of (meth)acrylic acid having an unsubstituted alkyl radical.

Preferably, the mixture of the olefinically unsaturated monomers contains 0.1 to 6.0 mol %, more preferably 0.1 to 2.0 mol %, most preferably 0.1 to 1.0 mol %, of polyolefinically unsaturated monomers. Preferably, the radical of the olefinically unsaturated monomers is monounsaturated.

Preferably, the mixture of the olefinically unsaturated monomers contains 0.1 to 6.0 mol %, more preferably 0.1 to 2.0 mol %, most preferably 0.1 to 2 mol %, of allyl methacrylate. More preferably, apart from allyl methacrylate, no further polyolefinically unsaturated monomers are present in the mixture.

Preferably, the mixture of olefinically unsaturated monomers contains less than 10.0% by weight, more preferably less than 5.0% by weight, of vinylaromatic hydrocarbons, based on the total amount of olefinically unsaturated monomers used in the polymerization. Most preferably, no vinylaromatic hydrocarbons are present in the mixture of the olefinically unsaturated monomers. It is especially preferable when less than 10.0% by weight, more preferably less than 5.0% by weight, based on the total amount of olefinically unsaturated monomers used in the polymerization, of olefinically unsaturated monomers having aromatic groups is used. More particularly, no olefinically unsaturated monomers having aromatic groups are present in the mixture of the olefinically unsaturated monomers.

It follows from this that the vinylaromatic hydrocarbons specified above as preferred, especially vinyltoluene, alpha-methylstyrene and styrene, are of course preferred only within the group of the monomers containing aromatic groups. In spite of this, these monomers are preferably not used in the context of the invention. Should the use of such monomers nevertheless be an option in the individual case, preference is given to using the monomers containing aromatic groups designated as preferred.

In a preferred embodiment, the mixture of olefinically unsaturated monomers comprises:
  98.0 to 99.5% by weight of one or more monounsaturated esters of (meth)acrylic acid having unsubstituted alkyl radicals, where the alkyl radicals preferably have 1 to 10 carbon atoms, and
  0.5 to 2.0% by weight of one or more polyunsaturated esters of (meth)acrylic acid,
based in each case on the total amount of olefinically unsaturated monomers used in the polymerization.

Preference is given to adding at least one solvent to the mixture of olefinically unsaturated monomers, said solvent preferably being miscible in any ratio with water and in any ratio with the mixture of olefinically unsaturated monomers. Suitable organic solvents are N-methylpyrrolidone, N-ethylpyrrolidone and ether alcohols, such as methoxypropanol in particular, though it should be noted that pyrrolidone-based solvents may be dispensed with for environmental reasons alone. However, the amount of the organic solvent is selected such that the aqueous character of the dispersion ultimately obtained is conserved.

By virtue of the preparation process described, the copolymers in the aqueous dispersion of the invention especially have a core-shell structure which can be achieved through the preparation process described. This core-shell structure is characterized by a core containing at least one polyurethane, and shell containing at least one polymer which has been obtained by polymerization of olefinically unsaturated monomers.

The core-shell structure described is achieved through the specific reaction conditions of the starved feed polymerization. Over the entire reaction time, there are never any great amounts of olefinically unsaturated monomers, which could penetrate into the polyurethane particles, in the presence of the initially charged polyurethane. The free radicals provided by the water-soluble initiator, which are always present during the addition of monomer in the aqueous phase, form oligomers immediately on addition, which can no longer penetrate into the polyurethane. These then polymerize on the surface of the polyurethane.

In a preferred embodiment, the weight ratio of core to shell is 80:20 to 20:80, more preferably 60:40 to 40:60. What is meant here is the ratio of the amounts of components used for production of core (step (i), polyurethane) and shell (step (ii), mixture of olefinically unsaturated monomers).

Preferably, the copolymers (CP) in the aqueous dispersion have a particle size (z average) of 60 to 130 nm, more preferably of 70 to 115 nm, measured by means of photon correlation spectroscopy with a Malvern Nano S90 (from Malvern Instruments) at 25±1° C. The instrument, equipped with a 4 mW He—Ne laser at a wavelength of 633 nm, covers a size range from 1 to 3000 nm.

The copolymers (CP) may preferably be crosslinked. The gel content of the aqueous dispersion of the invention is preferably 40 to 97% by weight, more preferably 75 to 90% by weight, based in each case on the solids of the dispersion.

The gel content can be determined gravimetrically by freeze-drying the dispersion, determining the total mass of the freeze-dried polymer (corresponds to the solids of the dispersion in the context of determining the gel content), and then extracting the polymer in an excess of tetrahydrofuran (ratio of tetrahydrofuran to freeze-dried polymer=300:1) at 25° C. for 24 hours. The insoluble fraction is removed and dried in an air circulation oven at 50° C. for four hours. Thereafter, the dried, insoluble fraction is weighed and the quotient is formed with the total mass of the freeze-dried polymer. The value obtained corresponds to the gel content.

The weight-average molar mass of the copolymers (CP) is preferably $3*10^7$ g/mol to $8.5*10^9$ g/mol, it being possible to determine the weight-average molar mass by small-angle laser light scattering.

The acid number of the copolymers (CP) is preferably 0 to 220 mg KOH/g solid resin, preferably 0 to 40 mg KOH/g solid resin, more preferably 0 to 25 mg KOH/g solid resin. The OH number is preferably less than 70 mg KOH/g solid resin, preferably less than 20 mg KOH/g solid resin. The terms "solid resin" and "solids" in relation to a polymer or a dispersion of a polymer are equivalent. Thus, they refer more particularly to the solids or solid content of a polymer dispersion as elucidated below.

The acid number can be determined, for example, on the basis of DIN EN ISO 2114 in homogeneous solution of THE/water (9 parts by volume of THE and 1 part by volume of distilled water) with ethanolic potassium hydroxide solution.

The OH number can be determined on the basis of R.-P. Krüger, R. Gnauck and R. Algeier, Plaste und Kautschuk, 20, 274 (1982), by means of acetic anhydride in the presence of 4-dimethylaminopyridine as a catalyst in a tetrahydrofuran (THF)/dimethylformamide (DMF) solution at room temperature, by fully hydrolyzing the excess of acetic anthydride remaining after acetylation and conducting a potentiometric back-titration of the acetic acid with alcoholic potassium hydroxide solution.

The aqueous dispersions of the at least one copolymer (CP) preferably have a solids content of 15 to 45% by weight, especially preferably 25 to 35% by weight. Solids contents of this kind can be established without any problem through the use of appropriate amounts of organic solvents and especially water in the course of preparation of the copolymers and/or by appropriate dilution after the preparation.

"Solids content" (nonvolatile content) is understood to mean that proportion by weight which remains as a residue on evaporation under fixed conditions. In the present application, the solids content is determined to DIN EN ISO 3251. This is done by evaporating the basecoat material at 130° C. for 6 minutes.

Unless stated otherwise, this test method is likewise employed in order, for example, to find out or predetermine the proportion of various components of the pigment paste, for example of a copolymer (CP), in the total weight of the paste. Thus, the solids content of a dispersion of a copolymer (CP) which is to be added to the paste is determined. By taking into account the solids content of the dispersion and the amount of the dispersion used in the paste, it is then possible to ascertain or find out the proportion of the component in the overall composition.

The expression "aqueous" is known to the skilled person. What is meant is basically a composition not based exclusively on organic solvents, i.e. not containing exclusively organic-based solvents, but instead containing, on the contrary, a significant proportion of water as solvent. "Aqueous" in the context of the present invention should preferably be understood to mean that the composition in question has a proportion of at least 40% by weight, preferably at least 50% by weight, even more preferably at least 60% by weight, especially at least 70% by weight, of water, based in each case on the total amount of the solvents present (i.e. water and organic solvents). Preferably in turn, the proportion of water is 40 to 95% by weight, especially 50 to 92.5% by weight, even more preferably 60 to 90% by weight, more preferably 70 to 87.5% by weight, based in each case on the total amount of the solvents present.

The proportion of the copolymers (CP) is preferably in the range from 3.0 to 35% by weight, more preferably 4 to 30.0% by weight, especially preferably 5.0 to 25.0% by weight, especially 6.0 to 20.0% by weight, based in each case on the total weight of the pigment paste of the invention.

The pigment paste of the invention comprises at least one pigment (P), i.e. a color pigment and/or effect pigment. Such color pigments and effect pigments are known to those skilled in the art and are described, for example, in Römpp-Lexikon Locke und Druckfarben, Georg Thieme Verlag, Stuttgart, N.Y., 1998, pages 176 and 451. The terms "coloring pigment" and "color pigment" are interchangeable, just like the terms "visual effect pigment" and "effect pigment".

Preferred effect pigments are, for example, platelet-shaped metal effect pigments such as platelet-shaped aluminum pigments, gold bronzes, oxidized bronzes and/or iron oxide-aluminum pigments, pearlescent pigments such as pearl essence, basic lead carbonate, bismuth oxide chloride and/or metal oxide-mica pigments and/or other effect pigments such as platelet-shaped graphite, platelet-shaped iron oxide, multilayer effect pigments composed of PVD films and/or liquid crystal polymer pigments. More preferably, platelet-shaped effect pigments, especially platelet-shaped aluminum pigments and metal oxide-mica pigments, are present in the pigment paste.

However, it is alternatively or additionally possible for typical color pigments to be present. Color pigments especially include inorganic coloring pigments such as white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The proportion of the pigments may, for example, be within the range from 1 to 75% by weight, preferably 15 to 70% by weight, more preferably 20 to 60% by weight, based in each case on the total weight of the pigment paste of the invention.

The weight ratio of the at least one pigment (P) to the at least one copolymer (CP) in the pigment paste is at least 1.5, preferably at least 2.0, especially preferably at least 2.5 and most preferably at least 3.0. Preference is given in turn to ranges from 1.5 to 10.0, preferably 2.0 to 8.5, especially 2.5 to 7 and most preferably 3.0 to 5.

The pigment paste comprises water. This follows from the fact that the pigment paste comprises an aqueous dispersion of a copolymer (CP). In addition, the pigment paste may comprise at least one typical organic solvent, for example butyl glycol.

The proportion of water is preferably 5 to 60% by weight, especially preferably 10 to 50% by weight, most preferably 15 to 40% by weight, based in each case on the total weight of the pigment paste.

In one embodiment, the proportion of organic solvents is preferably 15 to 65% by weight, especially preferably 20 to 55% by weight, most preferably 25 to 45% by weight, based in each case on the total weight of the pigment paste. The addition of organic solvents is an option especially in the case of pastes comprising aluminum effect pigments. In a further embodiment, the paste may also be completely or almost completely free of organic solvents. This is preferably the case when the pigments used are metal oxide-mica pigments. In such a case, the proportion of organic solvents is preferably less than 10% by weight, especially less than 5% by weight.

The pigment paste may also comprise customary additives such as, more particularly, wetting agents and dispersants. Such additives are used in the customary and known amounts.

The solids content of the pigment paste of the invention is preferably 20 to 80% by weight, more preferably 25 to 70% by weight, most preferably 30 to 60% by weight.

The pigment paste is used for production of coating materials, especially aqueous basecoat materials, as used in the automobile industry.

The coating compositions preferably likewise comprise a copolymer (CP). The pigment paste preferably comprises the same copolymer (CP) as the coating composition.

Preferably, a copolymer is the main binder in the coating composition. In the context of the present invention, a binder constituent is referred to as "main binder" when there is no other binder constituent present in a higher proportion in the coating composition, based on the total weight of the particular coating composition. A "binder" in the context of the present invention and in accordance with relevant DIN EN ISO 4618 is the nonvolatile component of a coating composition, without pigments and fillers. A binder constituent is accordingly a particular component which contributes to the binder in a coating composition. Examples include a particular polymer such as a copolymer (CP), a crosslinking agent such as a melamine resin, or a particular additive.

The coating compositions in which the inventive paste is used with preference thus preferably comprise an aqueous dispersion of a copolymer (CP). The copolymer (CP) is preferably the main binder constituent of the coating composition. The proportion of the copolymer (M) is preferably in the range from 2 to 30.0% by weight, preferably 3.0 to 20.0% by weight, more preferably 4.0 to 15.0% by weight, based in each case on the total weight of the coating composition.

The coating composition obviously comprises, at least through the use of a pigment paste of the invention, at least one pigment. Appropriate pigments have been described above. The preferred embodiments described there also apply to the coating composition. The proportion of the pigments is preferably in the range from 0.5 to 40.0% by weight, preferably 2.0 to 20.0% by weight, more preferably 3.0 to 15.0% by weight, based in each case on the total weight of the coating composition.

The coating composition preferably also comprises at least one polymer other than the copolymers (CP) as a binder, especially at least one polymer selected from the group consisting of polyurethanes, polyesters, mentioned, especially polyurethane polyacrylates.

Preferred polyurethanes are the polyurethanes already mentioned above in the description of step (i) of the preparation of the copolymers (CP). Preferred polyesters are described, for example, in DE 4009858 A1 in column 6 line 53 to column 7 line 61 and column 10 line 24 to column 13 line 3. Preferred polyurethane-polyacrylate copolymers (acrylated polyurethanes) other than the copolymers (CP) and the preparation thereof are described, for example, in WO 91/15528 A1, page 3 line 21 to page 20 line 33, and in DE 4437535 A1, page 2 line 27 to page 6 line 22. The polymers described as binders are preferably hydroxy-functional. The proportion of such polymers is preferably always lower than the proportion of the copolymer (CP).

In addition, the coating composition preferably comprises at least one typical crosslinking agent known per se. It preferably comprises, as a crosslinking agent, at least one aminoplast resin and/or blocked polyisocyanate, preferably an aminoplast resin. Among the aminoplast resins, melamine resins in particular are preferred. The proportion of the crosslinkers is preferably always lower than the proportion of the copolymer (CP).

In addition, the coating composition may also comprise at least one additive. Examples of such additives are thickeners such as inorganic thickeners, for example sheet silicates, and organic thickeners, for example (meth)acrylic acid-(meth)acrylate copolymer thickeners, for example the commercial product Rheovis AS S130 (BASF), and polyurethane thickeners, for example the commercial product Rheovis PU 1250 (BASF). Further possible additives are salts which can be broken down thermally without residue or substantially without residue, resins as binders that are curable physically, thermally and/or with actinic radiation and are different than the polymers already mentioned as binders, further crosslinking agents, organic solvents, reactive diluents, transparent pigments, fillers, dyes soluble in a molecular dispersion, nanoparticles, light stabilizers, antioxidants, deaerating agents, emulsifiers, slip additives, polymerization inhibitors, initiators of free-radical polymerizations, adhesion promoters, flow control agents, film-forming assistants, sag control agents (SCAs), flame retardants, corrosion inhibitors, waxes, siccatives, biocides, and matting agents. They can be used in the known and customary proportions.

The coating composition is preferably an aqueous coating composition, especially an aqueous basecoat material. A basecoat material is especially a color-imparting intermediate coating material that is used in automotive finishing and general industrial painting. This basecoat material is generally applied to a metallic or plastics substrate which has been pretreated with surfacer or primer-surfacer, or else, occasionally, directly to the plastics substrate. Substrates used may also include existing paint systems, which may optionally require pretreatment as well (by abrading, for example). It has now become entirely customary to apply more than one basecoat film. Accordingly, in such a case, a first basecoat film constitutes the substrate for a second such film. To protect a basecoat film from environmental effects in particular, at least one additional clearcoat film is applied over it.

Accordingly, the present invention is also directed to the production of multicoat paint systems, using at least one pigment paste in the course of this production, namely for production of an aqueous basecoat material.

The present invention likewise provides for the use of an aqueous dispersion comprising at least one copolymer (CP) as described above for production of pigment pastes, or for dispersion of pigments.

The present invention illustrated hereinafter by examples.

EXAMPLES

A) Preparation of a Copolymer (CP) or of an Aqueous Dispersion Comprising said Polymer a) A dispersion of an alpha-methylstyryl-containing polyurethane was prepared on the basis of the patent DE 19948004 B4, page 27, example 1, "Herstellung eines erfindungsgemäßen Polyurethans (B)" ["Preparation of a polyurethane (B) of the invention"], except with additional use of trimethylolpropane and with a solids content of the resulting dispersion of only 29% rather than 35.1% by weight. Based on the adduct (B2) mentioned in the patent DE 19948004 B4, preparation example 1, an adduct was prepared with monoethanolamine rather than with diethanolamine:

For this purpose, a reaction vessel equipped with stirrer, internal thermometer, reflux condenser and electrical heater was first initially charged, under nitrogen, with 200.0 parts by weight of methyl ethyl ketone, 800.0 parts by weight of N-methylpyrrolidone and 221.3 parts by weight of monoethanolamine (from BASF SE) at 20° C. To this mixture were added dropwise, over the course of one and a half hours, 778.7 parts by weight of 1-(1-isocyanato-1-methylethyl)-3-(1-methylethenyl)benzene (TMI® (META) Unsaturated Aliphatic Isocyanate, from Cytec) having an isocyanate content of 20.4% by weight of isocyanate, such that the reaction temperature did not exceed 40° C. The resulting reaction mixture was stirred until no free isocyanate groups were detectable any longer. Thereafter, the reaction mixture was stabilized with 200 ppm of hydroquinone.

The theoretical solids content of the solution of the described adduct thus prepared was 50% by weight.

Then, in a further reaction vessel equipped with stirrer, internal thermometer, reflux condenser and electrical heater, 431.7 parts by weight of a linear polyester polyol and 69.7 parts by weight of dimethylolpropionic acid (from GEO Specialty Chemicals) were dissolved in 355.8 parts by weight of methyl ethyl ketone and 61.6 parts by weight of N-methylpyrrolidone under nitrogen. The linear polyester polyol had been prepared beforehand from dimerized fatty acid (Pripol® 1012, from Uniqema), isophthalic acid (from BP Chemicals) and hexane-1,6-diol (from BASF SE) (weight ratio of the starting materials:

dimeric fatty acid to isophthalic acid to hexane-1,6-diol=54.00:30.02:15.98) and had a hydroxyl number of 73 mg KOH/g solids and a number-average molar mass of 1379 g/mol. Added to the resulting solution at 45° C. were 288.6 parts by weight of isophorone diisocyanate (Basonat® I, from BASF SE) having an isocyanate content of 37.75% by weight. After the exothermic reaction had abated, the reaction mixture was heated gradually to 80° C. while stirring. Stirring was continued at this temperature until the isocyanate content of the solution was constant at 3.2% by weight. Thereafter, the reaction mixture was cooled to 65° C., and 85.2 parts by weight of the above-described adduct were added together with 21.8 parts by weight of trimethylolpropane (from BASF SE). The resulting reaction mixture was stirred at 65° C. until the isocyanate content of the solution had fallen to 1.0% by weight. Now 22.2% by weight of the diethanolamine (from BASF SE) were added and the content of isocyanate groups was monitored until no free isocyanate groups were detectable any longer. The resulting dissolved polyurethane was admixed with 139.7 parts by weight of methoxypropanol and 43.3 parts by weight of triethylamine (from BASF SE). 30 minutes after the addition of amine, the temperature of the solution was lowered to 60° C., after which 1981 parts by weight of deionized water were added while stirring over the course of 30 minutes. The methyl ethyl ketone was distilled out of the resulting dispersion at 60° C. under reduced pressure. Thereafter, any losses of solvent and water were compensated for.

The dispersion of an alpha-methylstyryl-containing polyurethane thus obtained had a solids content of 29.0% by weight, the acid number was 34.0 mg KOH/g solids, and the pH was 7.0 (measured at 23° C.)

b) To prepare the aqueous primary dispersion of the copolymer (CP) of the invention, under a nitrogen atmosphere, 1961.2 parts by weight of the alpha-methylstyryl-containing polyurethane dispersion according to a) were diluted with 40.0 parts by weight of methoxypropanol (0.07% based on polyurethane) and 686.5 parts by weight of deionized water, and heated to 80° C. After the reactor contents had been heated to 80° C., 0.6 part by weight of ammonium peroxodisulfate, dissolved in 35.7 parts by weight of deionized water, was introduced into the reactor under standard pressure. Subsequently, with continued stirring, a mixture of 301.6 parts by weight of methyl methacrylate, 261.6 parts by weight of n-butyl acrylate, 5.6 parts by weight of allyl methacrylate (0.87 mol % based on total vinyl monomer) and 134.9 parts by weight of N-methylpyrrolidone was added homogeneously over the course of five hours. With commencement of the addition of the monomer mixture, a solution of 1.1 parts by weight of ammonium peroxodisulfate in 71.3 parts by weight of deionized water was likewise added within five hours.

During the free-radical polymerization, every 30 minutes, the content of free monomers was determined by means of gas chromatography (GC) (GC: once with 50 m silica capillary column with polyethylene glycol phase and once with 50 m silica capillary column with polydimethylsiloxane phase, carrier gas: helium, split injector 150° C., oven temperature 40-220° C., flame ionization detector, detector temperature 275° C., internal standard: isobutyl acrylate), and the highest total monomer content based on dispersion of 0.5% by weight was found after 30 min (3.1% by weight based on the total amount of olefinically unsaturated monomers used for polymerization). After the simultaneous end of the metered addition of monomer and initiator, the resulting reaction mixture was stirred at 80° C. for a further hour and then cooled to room temperature.

The resulting primary dispersion of the copolymer had a very good storage stability. The solids content thereof was 32.5% by weight, the acid number was 18.8 mg KOH/g solids, and the pH thereof was 7.0. The particle size (z average) by means of photon correlation spectroscopy was 96 nm. By means of gas chromatography (GC: once with 50 m silica capillary column with polyethylene glycol phase and once with 50 m silica capillary column with polydimethylsiloxane phase, carrier gas: helium, split injector 250° C., oven temperature 40-220° C., flame ionization detector, detector temperature 275° C., internal standard: n-propyl glycol), a content of 2.7% by weight of methoxypropanol and 5.7% by weight of N-methylpyrrolidone was found.

After the extraction of the freeze-dried polymer by means of tetrahydrofuran, the gel content was found gravimetrically to be 80.3% by weight. For this purpose, the dispersion was freeze-dried and the mass of the freeze-dried polymer was determined, and then the polymer was extracted in an excess of tetrahydrofuran (ratio of tetrahydrofuran to freeze-dried copolymer=300:1) at 25° C. for 24 hours. The insoluble content (gel content) was isolated, dried at 50° C. in an air circulation oven for 4 hours, and then re-weighed.

1. Production of a Non-Inventive Waterborne Basecoat Material 1

The components listed under "aqueous phase" in table A were stirred together in the order stated to form an aqueous mixture. In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to spray viscosity of 58 mPas under a shearing load of 1000 $s^{-1}$ as measured with a rotary viscometer (Rheomat RM 180 instrument from Mettler-Toledo) at 23° C.

TABLE A

Waterborne basecoat material 1

| Component | Parts by weight |
|---|---|
| Aqueous phase | |
| 3% Na—Mg sheet silicate solution | 22 |
| Deionized water | 22.4 |
| Butyl glycol | 0.8 |
| Polyurethane-modified polyacrylate; prepared as per page 7 line 55 to page 8 line 23 of DE 4437535 A1 | 3 |
| 50% by weight solution of Rheovis ® PU 1250 (BASF), rheological agent | 0.2 |
| 3% by weight aqueous Rheovis ® AS S130 solution; rheological agent, available from BASF, in water | 3 |
| TMDD (BASF) | 1.7 |
| Melamine-formaldehyde resin (Luwipal 052 from BASF SE) | 5.7 |
| 10% dimethylethanolamine in water | 1.1 |
| Polyurethane-based graft copolymer; prepared analogously to DE 19948004 - B4 (page 27, example 2), solids content adjusted to 32.5% by weight with water | 22 |
| Isopar ® L from Exxon Mobil | 2 |
| Pluriol ® P 900 from BASF SE | 0.8 |
| Blue paste | 0.1 |
| Organic phase (pigment paste) | |
| Aluminum pigment, available from Altana-Eckart | 5.6 |
| Butyl glycol | 6.6 |
| Polyester; prepared as per example D, column 16 lines 37-59 of DE-A-4009858 | 3 |

Production of the Blue Paste:

The blue paste was produced from 69.8 parts by weight of an acrylated polyurethane dispersion produced as per international patent application WO 91/15528, binder dispersion A, 12.5 parts by weight of Paliogen® Blue L 6482, 1.5 parts by weight of dimethylethanolamine (10% in demineralized water), 1.2 parts by weight of a commercial polyether (Pluriol® P900 from BASF SE) and 15 parts by weight of deionized water.

2. Production of a Non-Inventive Waterborne Basecoat Material 2

The waterborne basecoat material was produced analogously to table A, except that the 3 parts (by weight) of polyester prepared as per example D, column 16 lines 37-59 of DE-A-4009858, were used not in the organic phase (of the pigment paste) but in the aqueous phase. In addition, only 16.5 parts of the dispersion of the polyurethane-based graft copolymer, prepared analogously to DE 19948004-B4 (page 27, example 2), were used in the aqueous phase. A further 5.5 parts were used in the organic phase to disperse the aluminum pigments.

3. Production of a Non-Inventive Waterborne Basecoat Material 3

The waterborne basecoat material 3 was produced analogously to table A, except that, rather than the dispersion of the polyurethane-based graft copolymer prepared analogously to DE 19948004-B4 (page 27, example 2), the dispersion, described in A), of a copolymer (CP) was used.

4. Production of a Waterborne Basecoat Material I1 Using a Pigment Paste of the Invention The waterborne basecoat material I1 was produced analogously to waterborne basecoat material 3, except that the 3 parts (by weight) of polyester prepared as per example D, column 16 lines 37-59 of DE-A-4009858, were used not in the organic phase (of the pigment paste) but in the aqueous phase. In addition, only 16.5 parts of the dispersion, described in A), of a copolymer (CP) in the aqueous phase were used. A further 5.5 parts were used in the organic phase to disperse the aluminum pigments (pigment paste of the invention).

Comparison of Waterborne Basecoat Materials 1, 2, 3 and I1

(i) First of all, multicoat paint systems were produced using the waterborne basecoat materials 1, 2, 3 and I1.

A steel sheet of dimensions 10×20 cm coated with a commercial primer-surfacer served as the substrate. The particular basecoat material was applied electrostatically and then pneumatically to said sheet. Overall, application was effected so as to result ultimately in a dry coat thickness of the basecoats of 12 to 14 micrometers, and such that the ratio of the coat thickness that was achieved by the electrostatic application to the coat thickness that was achieved by the pneumatic application was 70:30. After the basecoat material had been flashed off at room temperature for 1 min, the basecoat material was intermediately dried in an air circulation oven at 70° C. for 10 min. A customary two-component clearcoat material was applied pneumatically in a film thickness of 35-45 micrometers to the intermediately dried waterborne basecoat. The resulting clearcoat was flashed off room temperature for 20 minutes. The waterborne basecoat and the clearcoat were then cured in an air circulation oven at 140° C. for 20 minutes.

The multicoat paint systems obtained were analyzed for their hue by means of an X-Rite measuring instrument at various reflection angles (hue specified using the CIELAB color space, i.e. L, a, b values), using waterborne basecoat material 1 as a reference. Table 1 shows the L, a, b values measured.

TABLE 1

| | | Waterborne basecoat material 1 | Waterborne basecoat material 2 | Waterborne basecoat material 3 | Waterborne basecoat material I1 |
|---|---|---|---|---|---|
| dL | 15° | 0 | −0.21 | 0.93 | 1.11 |
| | 25° | 0 | −0.07 | 0.12 | 0.55 |
| | 45° | 0 | 0.35 | −0.53 | −0.52 |
| | 75° | 0 | 0.61 | −0.30 | −0.37 |
| | 110° | 0 | 0.73 | −0.25 | −0.30 |
| da | 15° | 0 | −0.07 | −0.02 | 0.10 |
| | 25° | 0 | −0.09 | 0.00 | 0.05 |
| | 45° | 0 | 0.03 | 0.00 | 0.06 |

TABLE 1-continued

|    |      | Waterborne basecoat material 1 | Waterborne basecoat material 2 | Waterborne basecoat material 3 | Waterborne basecoat material I1 |
|----|------|-----|-------|-------|-------|
|    | 75°  | 0   | 0.10  | 0.01  | 0.04  |
|    | 110° | 0   | −0.05 | −0.01 | 0.03  |
| db | 15°  | 0   | 0.06  | 0.08  | 0.01  |
|    | 25°  | 0   | −0.09 | 0.00  | 0.07  |
|    | 45°  | 0   | −0.03 | −0.03 | −0.05 |
|    | 75°  | 0   | −0.07 | −0.07 | 0.09  |
|    | 110° | 0   | −0.13 | −0.02 | 0.10  |

(ii) In addition, further multicoat paint systems were produced using the waterborne basecoat materials 1, 2, and I1. A steel sheet of dimensions 30 cm×50 cm coated with a commercial primer-surfacer system was provided with an adhesive strip on one longitudinal edge, ire order to be able to determine the film thickness differences after the coating. The particular waterborne basecoat material was applied electrostatically in wedge format. The resulting waterborne basecoat film was flashed off at room temperature for one minute and subsequently intermediately dried in an air circulation oven at 70° C. for 10 minutes. A customary two-component clearcoat material was applied electrostatically in a film thickness of 38 to 42 micrometers to the intermediately dried waterborne basecoat. The resulting clearcoat was flashed off at room temperature for minutes. Waterborne basecoat film and clearcoat film were then jointly cured in an air circulation oven at 140° C. for 20 minutes.

There followed a visual assessment of the pinhole count and of the pinhole limit for the multicoat paint systems applied in wedge format which had been produced. "Pinhole limit" is understood to mean the coat thickness of the basecoat from which pinholes are discernible. Table 2 shows the corresponding results.

TABLE 2

| WBM | Pinhole limit (micrometres) | Pinhole count |
|-----|-----------------------------|---------------|
| 1   | 15 | 47 |
| 2   | 17 | 52 |
| 3   | 27 | 3  |
| I1  | 29 | 2  |

All paint systems (i) had an obviously very similar visual impression (hue) (table 1) and were also otherwise similar in terms of their optical properties. The results in table 1 show that a copolymer (CP) can be used for production of pigment pastes, in which case the pigment pastes are used in an aqueous basecoat material comprising the copolymer (CP) as a main binder. This gives greater formulation latitude. For example, as shown above, it is possible to integrate a polyester into the aqueous phase. It is equally possible to integrate further coating material components instead of or in addition to the polyester. In spite of this, no disadvantages whatsoever arise for the resulting paint system in terms of the visual properties (table 1). On the contrary, the basecoat materials which have been produced using the copolymer (CP) actually give a distinct improvement in stability to pinholes (table 2).

5. Production of a Non-Inventive Waterborne Basecoat Material 4

The components listed under "aqueous phase" in table B were stirred together in the order stated to form an aqueous mixture. In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to a spray viscosity of 58 mPas under a shearing load of 1000 $s^{-1}$ as measured with a rotary viscometer (Rheomat RM 180 instrument from Mettler-Toledo) at 23° C.

TABLE B

Waterborne basecoat material 4

| Component | Parts by weight |
|-----------|-----------------|
| Aqueous phase | |
| 3% Na—Mg sheet silicate solution | 27 |
| Deionized water | 15.9 |
| Butyl glycol | 2.2 |
| Polyurethane-modified polyacrylate; prepared as per page 7 line 55 to page 8 line 23 of DE 4437535 A1 | 2.4 |
| 50% by weight solution of Rheovis ® PU 1250 (BASF), rheological agent | 0.2 |
| Polyester; prepared as per example D, column 16 lines 37-59 of DE-A-4009858 | 1.2 |
| TMDD (BASF) | 1.2 |
| Melamine-formaldehyde resin (Luwipal 052 from BASF SE) | 4.7 |
| 10% dimethylethanolamine in water | 0.5 |
| Polyurethane-based graft copolymer; prepared analogously to DE 19948004 - B4 (page 27, example 2), solids content adjusted to 32.5% by weight with water | 21.1 |
| Isopropanol | 1.4 |
| Byk-347 ® from Altana | 0.5 |
| Pluriol ® P 900 from BASF SE | 0.3 |
| Tinuvin ® 384-2 from BASF SE | 0.6 |
| Tinuvin 123 from BASF SE | 0.3 |
| Carbon black paste | 4.3 |
| Blue paste | 11.4 |
| Mica dispersion | 3.9 |
| Organic phase (pigment paste) | |
| Aluminum pigment, available from Altana-Eckart | 0.3 |
| Butyl glycol | 0.3 |
| Polyester; prepared as per example D, column 16 lines 37-59 of DE-A-4009858 | 0.3 |

Production of the Blue Paste:

The blue paste was produced from 69.8 parts by weight of an acrylated polyurethane dispersion produced as per international patent application WO 91/15528, binder dispersion A, 12.5 parts by weight of Paliogen® Blue L 6482, 1.5 parts by weight of dimethylethanolamine (10% in demineralized water), 1.2 parts by weight of a commercial polyether (Pluriol® P900 from BASF SE) and 15 parts by weight of deionized water.

Production of the Carbon Black Paste:

The carbon black paste was produced from 25 parts by weight of an acrylated polyurethane dispersion produced as per international patent application WO 91/15528, binder dispersion A, 10 parts by weight of carbon black, 0.1 part by weight of methyl isobutyl ketone, 1.36 parts by weight of dimethylethanolamine (10% in demineralized water), 2 parts by weight of a commercial polyether (Pluriol® P900 from BASF SE) and 61.45 parts by weight of deionized water.

Production of the Mica Dispersion:

The mica dispersion was produced by mixing, using a stirrer unit, 1.3 parts by weight of polyester, prepared as per example D, column 16 lines 37-59 of DE-A-4009858, 1.3 parts by weight of butyl glycol, and 1.3 parts by weight of the commercial mica Mearlin Ext. Fine Violet 539V from Merck.

6. Production of a Non-Inventive Waterborne Basecoat Material 5

The waterborne basecoat material 5 was produced analogously to the waterborne basecoat material 4, except that 2.8 parts rather than 1.2 parts of the polyester prepared as per example D, column 16 lines 37-59 of DE-A-4009858 were used in the aqueous phase. The organic phase (a pigment paste) was correspondingly prepared with 0.3 part by weight of the polyurethane-based graft copolymer prepared analogously to DE 19948004-B4 (page 27, example 2), solids content adjusted to 32.5% by weight with water. In addition, the mica dispersions were produced by mixing, using a stirrer unit, 1.5 parts by weight of the polyurethane-based graft copolymer prepared analogously to DE 19948004-B4 (page 27, example 2), solids content adjusted to 32.5% by weight with water, and 1.3 parts by weight of Mearlin Ext. Fine Violet 539V mica from Merck. In the aqueous phase, correspondingly, only 19.3% by weight parts of the polyurethane-based graft copolymer prepared analogously to DE 19948004-B4 (page 27, example 2), solids content adjusted to 32.5% by weight with water, were used. In addition, a total of 3.5 parts by weight of butyl glycol rather than only 2.2 parts by weight were added to the aqueous phase.

7. Production of a Non-Inventive Waterborne Basecoat Material 6

The waterborne basecoat material 6 was produced analogously to table B, except that, rather than the dispersion of the polyurethane-based graft copolymer prepared analogously to DE 19948004-B4 (page 27, example 2), the dispersion, described in A), of a copolymer (CP) was used.

8. Production of a Waterborne Basecoat Material 12 Using a Pigment Paste of the Invention The waterborne basecoat material 12 was produced analogously to the waterborne basecoat material 6, except that 2.8 parts rather than 1.2 parts of the polyester prepared as per example D, column 16 lines 37-59 of DE-A-4009858 were used in the aqueous phase. The organic phase (a pigment paste) was correspondingly prepared with 0.3 part by weight of the dispersion, described in A), of a copolymer (CP) and without the polyester (a first pigment paste of the invention). In addition, the mica dispersions were produced by mixing, using a stirrer unit, 1.5 parts by weight of the dispersion, described in A), of a copolymer (CP) and 1.3 parts by weight of Mearlin Ext. Fine Violet 539V mica from Merck (a second pigment paste of the invention). In the aqueous phase, correspondingly, only 19.3% by weight parts of the dispersion, described in A), of a copolymer (CP) were used. In addition, a total of 3.5 parts by weight of butyl glycol rather than only 2.2 parts by weight were added to the aqueous phase.

Comparison of Waterborne Basecoat Materials 4, 5, 6 and 12

Analogously to the production and analysis of the multicoat paint systems which were produced using waterborne basecoat materials 1, 2, 3 and I1, multicoat paint systems were produced using waterborne basecoat materials 4, 5, 6 and I2 and analyzed. The results can be found in table 3 (multicoat paint systems (i), using the multicoat paint system comprising waterborne basecoat material 4 as reference) and table 4 (multicoat paint systems (ii)).

TABLE 3

|    |      | Waterborne basecoat material 4 | Waterborne basecoat material 5 | Waterborne basecoat material 6 | Waterborne basecoat material I2 |
|----|------|-------|-------|-------|-------|
| dL | 15°  | 0 | −0.38 | −0.77 | 0.66 |
|    | 25°  | 0 | −0.24 | −1.57 | −0.66 |
|    | 45°  | 0 | 0.12  | −0.89 | −0.55 |
|    | 75°  | 0 | 0.35  | −0.34 | −0.18 |
|    | 110° | 0 | 0.47  | −0.20 | −0.21 |
| da | 15°  | 0 | −0.39 | −0.51 | −1.33 |
|    | 25°  | 0 | −0.21 | −0.22 | −0.21 |
|    | 45°  | 0 | 0.12  | −0.46 | −0.04 |
|    | 75°  | 0 | 0.08  | −0.04 | −0.02 |
|    | 110° | 0 | 0.21  | 0.08  | 0.01 |
| db | 15°  | 0 | 0.24  | 0.73  | 0.30 |
|    | 25°  | 0 | 0.12  | 1.24  | 0.06 |
|    | 45°  | 0 | 0.02  | 1.80  | 0.16 |
|    | 75°  | 0 | 0.13  | 0.76  | −0.24 |
|    | 110° | 0 | 0.27  | 0.20  | −0.34 |

TABLE 4

| WBM | Pinhole limit (micrometres) | Pinhole count |
|-----|-----|-----|
| 4   | 15  | 24  |
| 5   | 17  | 37  |
| 6   | 25  | 7   |
| I2  | 31  | 3   |

Again, all paint systems (i) had an obviously very similar visual impression (hue) (table 3) and were also otherwise similar in terms of their optical properties. At the same time, however, the multicoat paint systems which were produced using the copolymer (CP) had a much-improved pinhole limit (multicoat paint systems (ii), table 4). Accordingly, through the use of pigment pastes of the invention (see multicoat paint system with waterborne basecoat I2), it is possible to combine excellent performance properties with high formulation latitude.

The invention claimed is:
1. A pigment paste, comprising:
   at least one aqueous dispersion, comprising:
      at least one pigment, and
      at least one copolymer,
      wherein said copolymer is obtained by
         (i) initially charging an aqueous dispersion of at least one polyurethane, and then
         (ii) polymerizing a mixture of olefinically unsaturated monomers in the presence of the polyurethane from (i), wherein
            (a) at least one water-soluble initiator is present for said polymerizing,
            (b) said polymerizing comprises metering the olefinically unsaturated monomers into a reaction solution so that a concentration of 6.0% by weight, based on the total amount of olefinically unsaturated monomers used for polymerization, in the reaction solution is not exceeded over the entire reaction time, and
            (c) the mixture of the olefinically unsaturated monomers comprises at least one polyolefinically unsaturated monomer,
   wherein the weight ratio of the at least one pigment to the at least one copolymer is greater than 1.5.
2. The pigment paste as claimed in claim 1, wherein said polymerizing comprises metering the olefinically unsaturated monomers into a reaction solution so that a concentration of 4.0% by weight, based on the total amount of olefinically unsaturated monomers used for polymerization, in the reaction solution is not exceeded over the entire reaction time.

3. The pigment paste as claimed in claim 1, wherein the mixture of olefinically unsaturated monomers of said polymerizing comprises 0.1 to 6.0 mol % of polyolefinically unsaturated monomers, based on the total amount of olefinically unsaturated monomers used for polymerization.

4. The pigment paste as claimed in claim 1, wherein the mixture of olefinically unsaturated monomers of said polymerizing comprises 0.1 to 2.0 mol % of polyolefinically unsaturated monomers, based on the total amount of olefinically unsaturated monomers used for polymerization.

5. The pigment paste as claimed in claim 1, wherein the mixture of olefinically unsaturated monomers of said polymerizing comprises 0.1 to 6.0 mol % of allyl methacrylate and no further polyolefinically unsaturated monomers.

6. The pigment paste as claimed in claim 1, wherein the mixture of olefinically unsaturated monomers of said polymerizing comprises less than 10.0% by weight of vinylaromatic monomers, based on the total amount of olefinically unsaturated monomers.

7. The pigment paste as claimed in claim 1, wherein the mixture of olefinically unsaturated monomers of said polymerizing does not comprise any vinylaromatic monomers.

8. The pigment paste as claimed in claim 1, wherein a weight ratio of the at least one pigment to the at least one copolymer is greater than 2.0.

9. The pigment paste as claimed in claim 1, wherein a weight ratio of the at least one pigment to the at least one copolymer is greater than 2.5.

10. The pigment paste as claimed in claim 1, wherein a weight ratio of the at least one pigment to the at least one copolymer is 3.0 to 5.0.

11. The pigment paste as claimed in claim 1, wherein the pigment is an effect pigment.

12. The pigment paste as claimed in claim 11, wherein the pigment is at least one pigment selected from the group consisting of a platelet-shaped, aluminum pigments and a metal oxide-mica pigment.

13. The pigment paste as claimed in claim 1, wherein the paste comprises a platelet-shaped aluminum pigment and at least one organic solvent.

14. The pigment paste as claimed in claim 1, wherein the paste comprises a metal oxide-mica pigment and less than 1000 by weight of organic solvents.

15. A method of dispersing an effect pigment, comprising:
dispersing an effect pigment in water to form an aqueous dispersion comprising said effect pigment,
wherein said dispersing is carried out in the presence of a copolymer, and
wherein said copolymer is obtained by:
(i) initially charging an aqueous dispersion of at least one polyurethane, and then
(ii) polymerizing a mixture of olefinically unsaturated monomers in the presence of the polyurethane from (i), wherein
(a) at least one water-soluble initiator is present for said polymerizing,
(b) said polymerizing comprises metering the olefinically unsaturated monomers into a reaction solution so that a concentration of 6.0% by weight, based on the total amount of olefinically unsaturated monomers used for polymerization, in the reaction solution is not exceeded over the entire reaction time, and
(c) the mixture of the olefinically unsaturated monomers comprises at least one polyolefinically unsaturated monomer.

16. The pigment paste as claimed in claim 1, wherein the at least one copolymer has a core-shell structure, wherein the core comprises the at least one polyurethane, and the shell comprises at least one polymer obtained by polymerization of the olefinically unsaturated monomers.

* * * * *

UNITED STATES PATENT AND TRADEMARK OFFICE
CERTIFICATE OF CORRECTION

PATENT NO. : 10,040,962 B2
APPLICATION NO. : 15/104828
DATED : August 7, 2018
INVENTOR(S) : Bernhard Steinmetz et al.

It is certified that error appears in the above-identified patent and that said Letters Patent is hereby corrected as shown below:

On the Title Page

In Column 2, item (56), foreign patent documents, Line 1, "4009358" should read -- 4009858 --, therefor.

In the Specification

In Column 4, Lines 9-11, "Polymercharakterisierung".....substance)." should read the same as Column 4, Line 8, as the continuation of same paragraph.

In Column 5, Line 32, "2,2" should read -- 2,2' --, therefor.

In Column 10, Line 34, "shell" should read -- a shell --, therefor.

In Column 11, Line 24, "THE/water" should read -- THF/water --, therefor.

In Column 11, Line 25, "THE" should read -- THF --, therefor.

In Column 11, Lines 32-33, "anthydride" should read -- anhydride --, therefor.

In Column 11, Line 49, "6" should read -- 60 --, therefor.

In Column 12, Line 20, "Locke" should read -- Lacke --, therefor.

In Column 12, Line 53, "from 1" should read -- from 10 --, therefor.

In Column 13, Line 64, "polyesters," should read -- polyesters, polyacrylates and/or copolymers of the polymers --, therefor.

Signed and Sealed this
Third Day of December, 2019

Andrei Iancu
*Director of the United States Patent and Trademark Office*

CERTIFICATE OF CORRECTION (continued)
U.S. Pat. No. 10,040,962 B2

In Columns 13, Lines 66-67 and Column 14, Lines 1-11, "Preferred........copolymer (CP)." should read the same as Column 13, Line 65 as the continuation of same paragraph.

In Column 14, Line 16, "blocked" should read -- a blocked --, therefor.

In Column 15, Line 5, "invention" should read -- invention is --, therefor.

In Column 17, Line 64, "material" should read -- material 2 --, therefor.

In Column 19, Line 14 (approx.), "2," should read -- 2, 3 --, therefor.

In Column 19, Line 17, "ire order" should read -- in order --, therefor.

In Column 21, Line 37, "12" should read -- I2 --, therefor.

In the Claims

In Column 24, Line 3, Claim 12, "platelet-shaped," should read -- platelet-shaped --, therefor.

In Column 24, Line 10, Claim 14, "1000" should read -- 10% --, therefor.